United States Patent [19]

Östbo

[11] 3,807,009

[45] Apr. 30, 1974

[54] METHOD OF MANUFACTURING CURVED TUBE SECTIONS AND THE LIKE

[76] Inventor: John Davis Bertil Östbo, Byvagen 38, 151 52 Sodertalje, Sweden

[22] Filed: Mar. 16, 1972

[21] Appl. No.: 235,189

[30] Foreign Application Priority Data
Apr. 6, 1971 Sweden................................ 4453/71

[52] U.S. Cl.................... 29/157 A, 29/411, 29/421, 29/463, 29/480
[51] Int. Cl... B21d 53/00, B21k 29/00, B23p 15/26
[58] Field of Search ......... 29/463, 411, 157 A, 421, 29/480

[56] References Cited
UNITED STATES PATENTS

| | | | |
|---|---|---|---|
| 2,192,471 | 3/1940 | Harbison | 29/463 UX |
| 2,582,358 | 1/1952 | Schoellerman | 29/421 |
| 2,579,646 | 12/1951 | Branson | 29/421 |
| 3,024,525 | 3/1962 | Wisberger | 29/421 |

Primary Examiner—Charlie T. Moon
Attorney, Agent, or Firm—Pollock, Philpitt & Vande Sande

[57] ABSTRACT

A method of manufacturing curved tube sections from a tube loop which is first produced closed in the direction of its longitudinal axis and then by cutting along planes transverse to said axis divided into individual tube sections. In particular, two blanks consisting of the material from which the tube sections are to be manufactured, and each having a central opening, are sandwiched together and then joined along their internal and external edges, such as by welding. A pressurized agent is introduced into the omnilaterally closed space defined between the blanks to cause the material thereof to deform. The deformation of the materials forms a loop, the cross-section of which corresponds to the desire profile of the tube sections. In one embodiment of the method, the deformation is controlled by enclosing the blanks in a mold having an internal cavity the dimensions of which correspond to the desired dimensions of the loop.

2 Claims, 6 Drawing Figures

METHOD OF MANUFACTURING CURVED TUBE SECTIONS AND THE LIKE

My Swedish Pat. No. 336,318 (corresponding to copending U.S. Pat. application Ser. No. 347,030 which is a continuation of a prior U.S. Pat. application Ser. No. 137,160, now abandoned) discloses a method of manufacturing curved tube sections and the like which, in comparison with the prior art methods, involves a radical rationalization and a corresponding considerable reduction of the manufacturing costs. The method covered by the just-mentioned patent involves, as its first step, forming a number of intermediate segments each of which is closed in its longitudinal direction and has a cross-sectional profile corresponding to a segment of the wall of the tube which is to be finally manufactured. A number of these segments are then joined, such as by welding, to form an article completely closed in its circumferential direction, i.e., a tube which is thus also closed in its longitudinal direction meaning that it can be described as a tubular loop. Finally, the desired tube sections are cut out by division of that loop. The cuts are made in a plane substantially transverse to the longitudinal axis of the tube and normally in a plane perpendicular to that axis. The segments are generally formed by a pressing or rolling operation but they can also be manufactured by a casting process. The forming method relied on and the number of segments is determined individually with regard to various manufacturing parameters and conditions, in the first place the wall thickness of the material and the handling capacity of the machine equipment available. However, quite apart from those variations it is a general characteristic of that known method that each segment is formed individually which means that the number of forming steps is at least as great as the number of segments. As is readily understood, when each workpiece has to be deformed twice or several times, the total number of working operations is naturally still greater.

The main object of the present invention is to provide a method permitting a still further reduction of the manufacturing costs by making it possible to form the loop constituted by the composed segments not only in one single step but also with the aid of an equipment requiring substantially lower investments than do machines like presses, mills and lathes. As will appear from the detailed specification below, those advantages are especially prominent and valuable when the dimensions of the tube sections are great in relation to the tube wall thickness.

In carrying out the present invention two blanks, consisting of the material from which the curved tube sections are to be manufactured and each having a central opening, are placed close to each other with their edges registering and then joined along their external edges as well as along the edges of their registering central openings. In this way there is between the two blanks formed an omnilaterally closed space in which a pressurized agent is introduced so that the material of the blanks is deformed plastically to assume the shape of a loop the cross-section of which is caused to correspond to the desired profile of the curbed tube sections under manufacture.

In many applications there is, in accordance with a further characteristic of the invention, suitable not to let the deformation in response to the pressurization occur freely. Instead, the blanks are disposed inside a mould the inner walls of which control the deformation of the blanks to a loop exhibiting the exact desired dimensions.

The invention will now be described in greater detail, reference being made to the accompanying diagrammatic drawing illustrating the basic steps of the method and relating to a specific embodiment of the invention.

Figure 5:
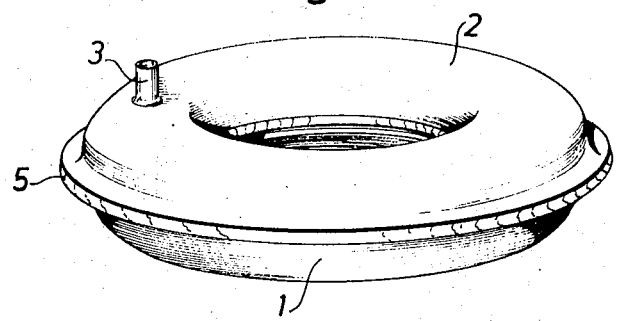
FIG. 5 shows a completed loop removed from its mould.
Figure 6:
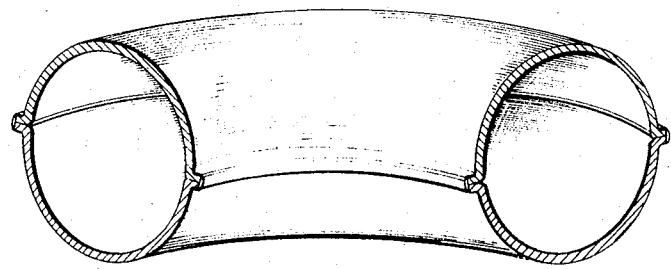

FIG. 6, finally, illustrates a tube section formed by division of the annular loop illustrated in FIG. 5.

Figure 1:
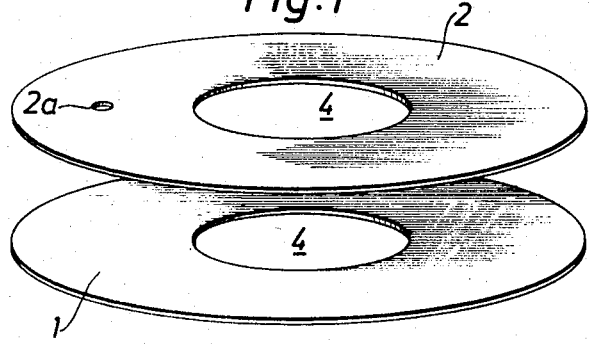
FIG. 1 illustrates the first working step, production of two congruent blanks.

In accordance with the embodiment of the invention here selected for the purpose of illustrating the inventive idea the tube sections are provided by division of an annular, or toroidal, loop as shown in FIG. 5. For that reason, the two blanks 1 and 2 shown in FIG. 1 are shaped like washers the central openings of which are designated by reference numeral 4. One of the blanks does in addition thereto have a small opening 2a.

Figure 2:
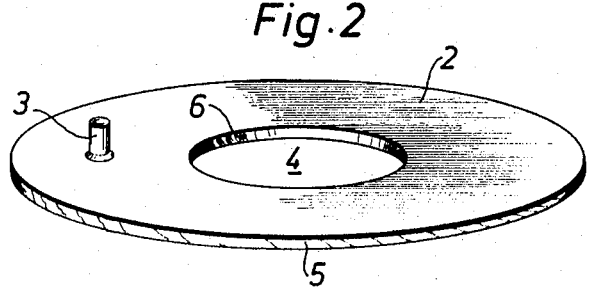
FIG. 2 illustrates the blanks shown in FIG. 1 joined together and provided with means permitting introduction of a pressurized agent into the slot-shaped space between the blanks.
Figure 3:
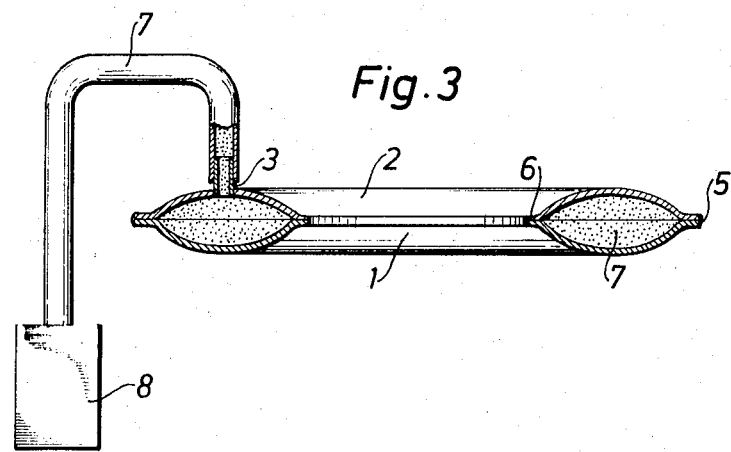
FIG. 3 shows an intermediate step in the deformation of the blanks to a tube loop.

FIG. 2 illustrates how the two blanks according to FIG. 1 have been placed on top of each other in a sandwich fashion and provided with circumferential weld joints, to wit one outer such joint 5 and one inner 6. To hole 2a there has been welded a tubular connector 3. Before the deformation process shown in FIG. 3 can be started there is to connector 3 connected the one end of a pipe 7 the opposite end of which is connected to a suitable pressure source 8. The latter has here been shown diagrammatically in block form but in practice it may be constituted by a pump, a driving motor for the pump, non-return valves and similar means the detailed design of which will be apparent to any one skilled in the art. The pressurizing agent used could be either pneumatic or hydraulic. It appears from FIG. 3 that when the pressurizing agent is forced into the slot between the two washer-like blanks 1 and 2, the latter are forced apart and plastically deformed into an arcuate profile.

Figure 4:
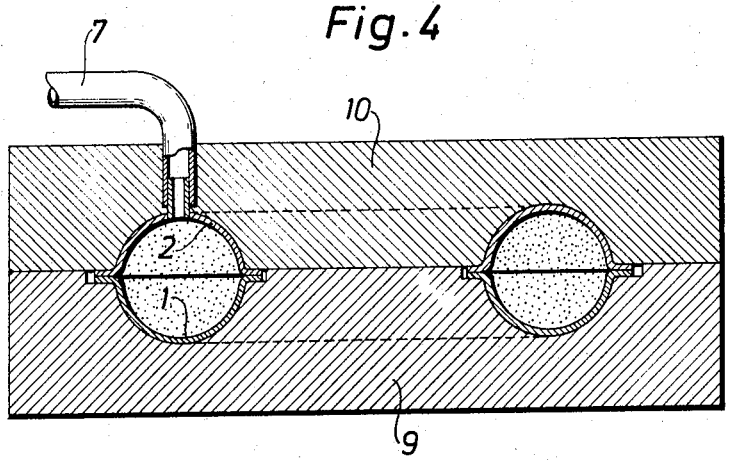
FIG. 4 shows use of an external mould for controlling the deformation of the loop under production.

In the modification shown in FIG. 4 the workpiece has been disposed inside a mould composed by a bottom mould half 9 and a top mould half 10. The internal cavity of the mould does completely correspond to the desired dimensions of the torus shown in FIG. 5. As is understood, use of this relatively simple and inexpensive auxiliary equipment solves the problem of making sure that the final dimensions of the torus-like loop are exact and well-defined.

Upon completion of the deformation step the torus is removed from the mould. When necessary or desired, the loop can be pressure-tested and it is a significant advantage of the invention that equipment 3, 7, 8 renders itself for that purpose as well. To carry out the pressure test on the torus, i.e., before the division thereof into individual tube sections, involves several advantages, in the first place elimination of the need of providing each tube section with end walls which have again to be removed when the pressure test is finalized. The last step of the method is to divide the torus so that sompleted and tested tube sections of the general configuration shown in FIG. 6 are obtained. That division can be carried out according to any known or similar method, such as by sawing or by use of gas or electric cutting equipment.

It should be emphasized that the drawing as well as the description are intended only to account for the basic inventive idea and to illustrate a specific embodiment thereof. It thus follows that the invention can in several respects be modified within the scope of the claims. By way of example, the blanks do not have to be circular but could exhibit any appearance as soon as they can be used to form an omnilaterally closed loop. Further, it is not necessary that the two blanks, used pairwise, are absolutely congruent but on the other hand this is generally most convenient. The invention is especially applicable in the production of tube sections from thin metal sheet, the latter term signifying in this connection metal thicknesses of the order of 2–3 mms. (approximately 80–120 mils). The deformation process is facilitated if carried out at an elevated temperature and the corresponding temperature rise may completely or partially be provided by the pressurizing agent.

I claim:

1. A method of manufacturing curved tube sections from a tube loop which is first produced closed in the direction of its longitudinal axis and then by cutting along planes transverse to said axis dividing said tube loop into individual tube sections, comprising the steps of;

abutting two blanks consisting of the material from which said tube sections are to be manufactured, each of said blanks having a central opening, joining said blanks along their external and internal edges, placing said joined blanks into a mold having an internal cavity corresponding to the desired dimensions of the loop, introducing a pressurized agent into the omnilaterally closed space defined between said blanks thus causing the material thereof, by plastic deformation, to form the loop, the cross-section of which is caused to correspond to the desired profile of the tube sections.

2. A method as in claim 1 wherein pressurized air is the deformation-generating agent.

* * * * *